United States Patent [19]

Blacklaw

[11] Patent Number: 5,240,274
[45] Date of Patent: Aug. 31, 1993

[54] HANDLE MECHANISM FOR TRAILER COUPLING

[75] Inventor: Rocky A. Blacklaw, Mulino, Oreg.

[73] Assignee: Premier Equipment, Inc., Portland, Oreg.

[21] Appl. No.: 858,594

[22] Filed: Mar. 27, 1992

[51] Int. Cl.5 ............................................. B60D 1/00
[52] U.S. Cl. ................................... 280/504; 280/507
[58] Field of Search ............... 280/504, 507, 508, 509; 70/232, 258, 14

[56] References Cited

U.S. PATENT DOCUMENTS

| | | | |
|---|---|---|---|
| 2,842,380 | 7/1958 | Weiss | 280/504 |
| 2,845,281 | 7/1958 | Holder et al. | 280/515 |
| 4,758,015 | 7/1988 | Pixley | 280/507 |

*Primary Examiner*—Margaret A. Focarino
*Assistant Examiner*—Victor E. Johnson
*Attorney, Agent, or Firm*—Chernoff, Vilhauer, et al.

[57] ABSTRACT

A handle mechanism for a trailer coupling of the type having a coupling member that is rotatably mounted in a body and is movable between an open position, where a draw bar eye can be placed on or removed from the coupling member, and a closed position where it cannot, a latch that prevents rotation of a coupling member without first rotating the latch and a lug that prevents rotation of the latch unless the shaft that carries the latch is moved sideways in the body against a spring. An annular ring rotatably mounted on an end of the shaft that extends out of the body acts as a cam element that bears against the body when it is rotated, to move the shaft longitudinally in the body and thus move the latch away from the lug that prevents its rotation. An L-shaped handle attached to the ring provides a mechanical advantage in the rotation of the ring and facilitates rotation of the shaft after it has been pulled sideways. The cam action of the ring and the mechanical advantage imparted to it by the handle allow the shaft to be moved, even when a load is transmitted to the latch through the coupling element which prevents it from being easily moved.

13 Claims, 3 Drawing Sheets

HANDLE MECHANISM FOR TRAILER COUPLING

BACKGROUND AND SUMMARY OF THE INVENTION

This invention relates to a double lock trailer coupling of the type in which a latch and the rotatable shaft it is mounted on must be shifted along the longitudinal axis of the shaft in order to open the coupling, and more particularly to a mechanism that facilitates movement of this shaft.

Trailer couplings, of the type where the eye of a draw bar is placed on a cylindrical coupling member and is held in place on the coupling member by a prong that contacts the tip of the coupling member, have a mechanism to rotate either the prong or the coupling member in order to install or remove the draw bar. In order to prevent accidental opening of the trailer coupling, it must have a lock mechanism, and preferably it should have a double lock that requires two distinct actions before the trailer coupling will open. A trailer coupling of this type having a double lock mechanism is disclosed in Weiss U.S. Pat. No. 2,842,380. The Weiss trailer coupling includes a hollow body that is attachable to a vehicle and has a rearwardly projecting prong. A coupling member, that receives the draw bar eye, is rotatably mounted in the body for movement between a closed position where it contacts the prong, and an open position where it is separated from the prong. A latch, that is rotatably mounted in the body, is urged downwardly by a spring into contact with the forward end of the coupling member when the coupling member is closed. Thus, the latch must be rotated away from the coupling member before the coupling member can be opened. The latch is mounted on a shaft which is rotatably mounted in the body and is slidable along its longitudinal axis. A spring normally urges the latch against one side wall of the body, and the latch has a protruding tongue that engages a lug located on the body side wall when the latch is in its normal position to prevent rotation of the latch away from the coupling member. Thus, to open the coupling member, the shaft must first be pulled sideways and then rotated, which is accomplished through a handle mounted on the end of the shaft.

While this mechanism provides an effective double lock, if there is a load on the draw bar it can be transmitted through the coupling member to the latch, making it extremely difficult to pull the latch away from the lug so that it can be rotated. When this occurs it often is necessary to strike the handle with a hammer, which not only is inconvenient but can create uncontrolled opening action.

The subject invention overcomes the foregoing shortcoming of the prior art trailer couplings of this type by placing a cam element on the shaft, which causes the shaft to be moved longitudinally to pull the latch away from the lug when the cam element is rotated. A lever handle associated with the cam element provides a mechanical advantage that assists in its rotation.

In a first embodiment, the cam element is an annular ring that encircles a portion of the shaft that extends out of the body. The ring is joined to the shaft by a pin that extends rotatably through the shaft and is attached at each of its ends to the ring. The ring has a flat side that contacts a flat face on a boss formed in the body when the latch is in its normal longitudinal orientation. The handle is L-shaped, with a shorter portion that is attached to the ring, and has an axis that is normal to the center line of the pin, and a longer portion that is parallel with the shaft and extends over the prong.

In a second embodiment, the ring is joined to the shaft by a stop that is attached to the terminal end of the shaft such that the ring is sandwiched between the stop and the boss.

Accordingly, it is a principal object of the present invention to provide a handle assembly for a trailer coupling that utilizes a rotating cam element to facilitate moving the latch sideways so that it can be rotated away from the coupling member.

It is a further object of the subject invention to provide such a trailer coupling that has a lever handle that provides a mechanical advantage for rotating the cam element.

It is a still further object of the subject invention to provide such a trailer coupling in which the cam element is an annular ring that encircles the latch shaft and engages the body of the trailer coupling when it is rotated.

It is a yet further object of the subject invention to provide such a trailer coupling in which the handle is L-shaped with a shorter portion having an axis that is normal to the latch shaft, and a longer portion having an axis that is parallel with the latch shaft.

The foregoing and other objectives, features and advantages of the present invention will be more readily understood upon consideration of the following detailed description of the invention taken in conjunction with the accompanying drawings.

DETAILED DESCRIPTION OF THE PREFERRED EMBODIMENT

Figure 1:
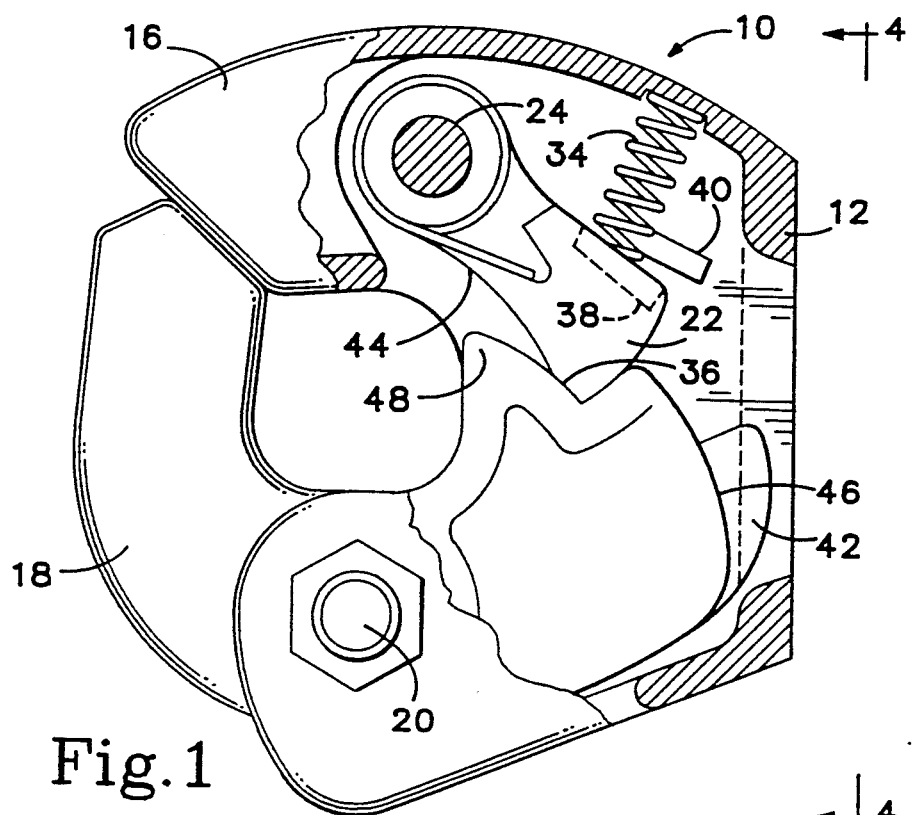
FIG. 1 is a side elevation view, partially broken away to show hidden detail, of a trailer coupling embodying the subject invention in its closed orientation.
Figure 2:
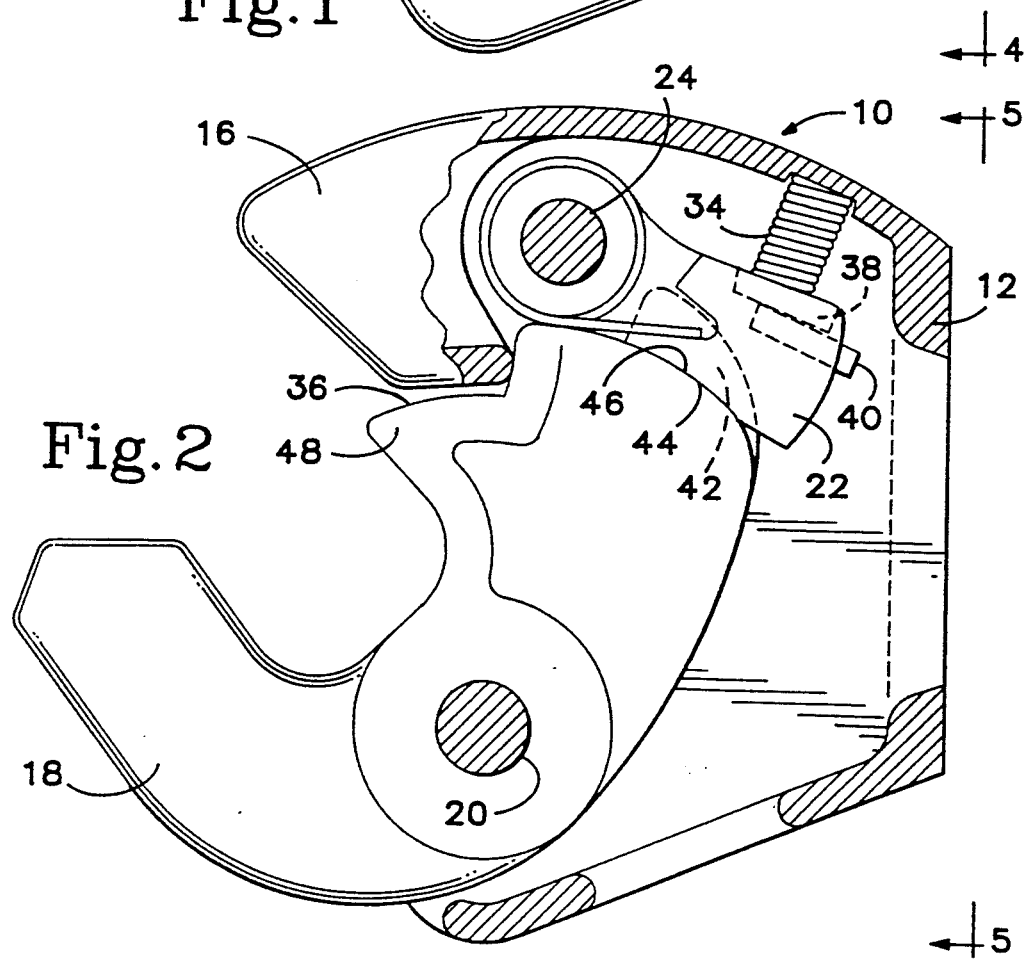
FIG. 2 is a side elevation view, similar to FIG. 1, showing the coupling in its open orientation.

Referring to FIGS. 1 and 2 of the drawings, the trailer coupling of the subject invention includes a hollow body 10 having a flat base 12 configured for mounting the coupling to a vehicle by placing bolts (not shown) through holes 14 located in the base and mating holes located in the vehicle. The top portion of the body includes a prong 16 that projects rearwardly from the base. Rotatably mounted in the body, below the prong 16, is a generally arcuate coupling member 18. The coupling member is attached to the body at approximately its mid point by a nut and bolt 20. Part of the coupling member lies within the body and part extends rearwardly and upwardly from the body. The coupling member 18 rotates between a closed position where its tip contacts the prong 16, FIG. 1, and an open position where it is separated from the prong to allow insertion of a draw bar eye onto the coupling member, FIG. 2.

Figures 3, 6, 7:
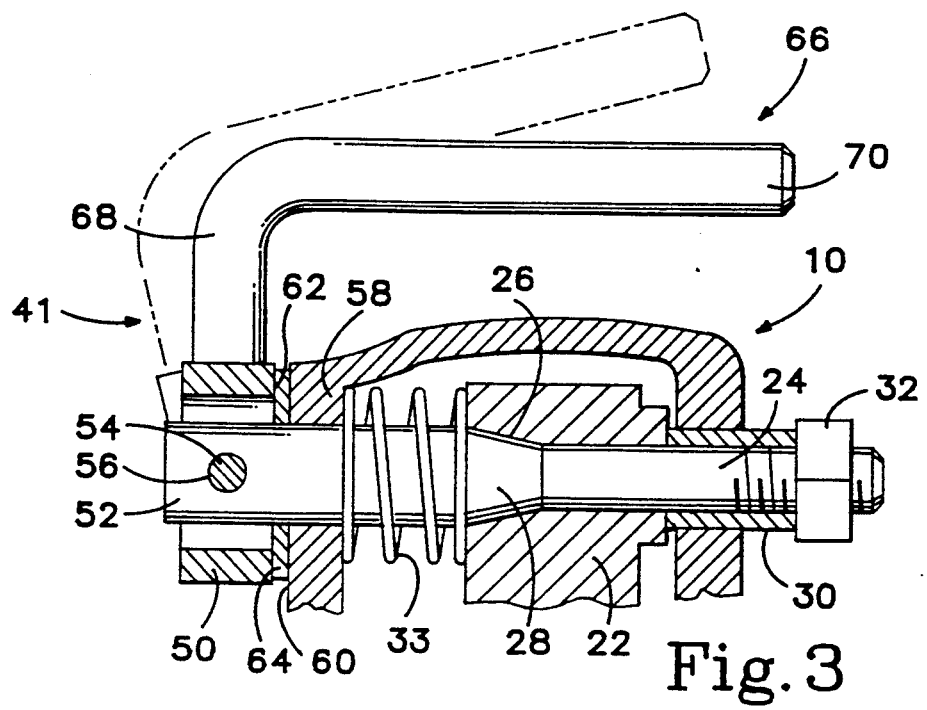
FIG. 3 is a detail view, in cross section, of an element of the invention.
FIG. 6 is a detail view, similar to FIG. 3, showing an alternate embodiment of the invention.
FIG. 7 is a sectional view taken on the line 7—7 of FIG. 6.

Mounted in the body 10 above the coupling member is a latch 22. Referring now also to FIG. 3, the latch is rotatably mounted on a shaft 24 which extends across the body. The shaft is keyed to the latch by having flats 26 formed on a conical portion 28 of the shaft which cooperatively fit against flats formed on the latch. The shaft slidably extends through the left-hand side wall of the body, as viewed in FIG. 3, and its right-hand portion carries a bushing 30 that slidably extends through the right-hand side wall of the body. A nut 32, which is threaded onto the right-hand end of the shaft, clamps the bushing 30 against the latch 22. This seats the flats 26 on the shaft onto the flats on the shaft and joins the latch and the shaft so that they will rotate and slide back and forth in the body as a single unit. A spring 33, which fits between the latch and the left-hand side wall of the body, normally urges the latch against the right-hand side wall of the body. Another spring 34 urges the latch clockwise, as viewed in FIGS. 1 and 2. A notch 36, located at the inner end of the coupling member receives the latch when the coupling member is closed and the latch is rotated clockwise by the spring 34. Thus, the latch engages the coupling member and prevents its rotation unless the latch is first rotated counterclockwise to where it is lifted out the notch 36.

Figure 4:
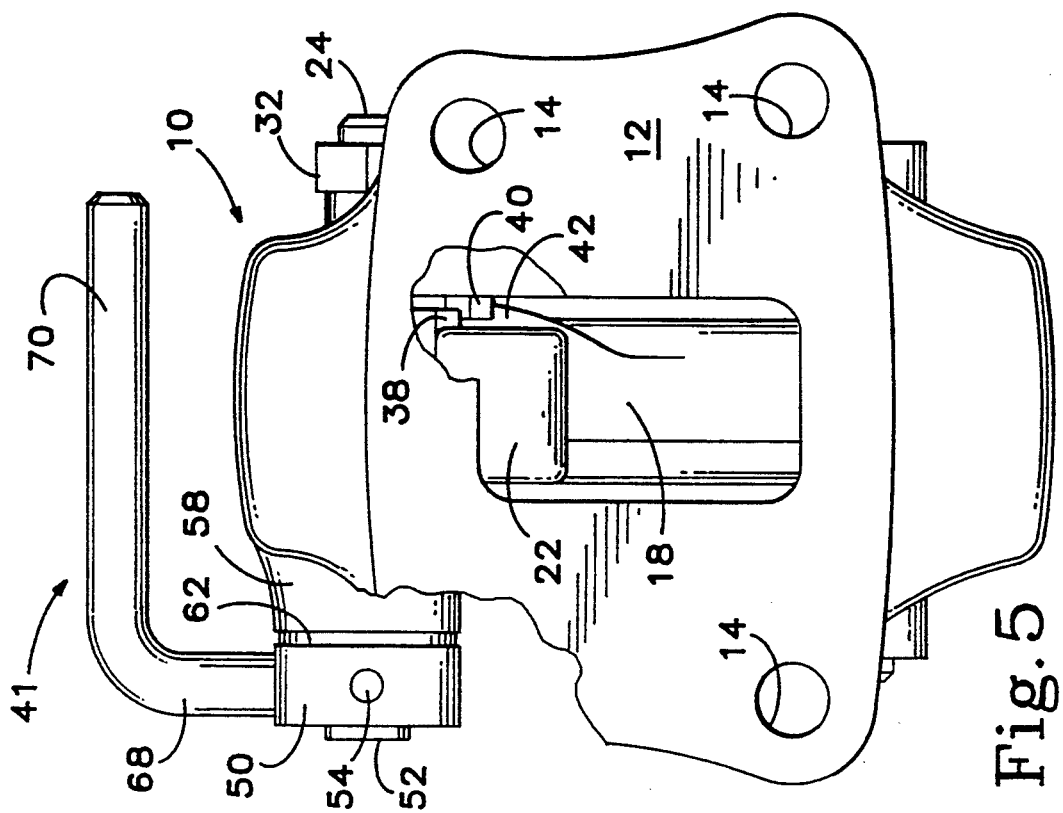
FIG. 4 is a sectional view taken along the lines 4—4 in FIG. 1.
Figure 5:
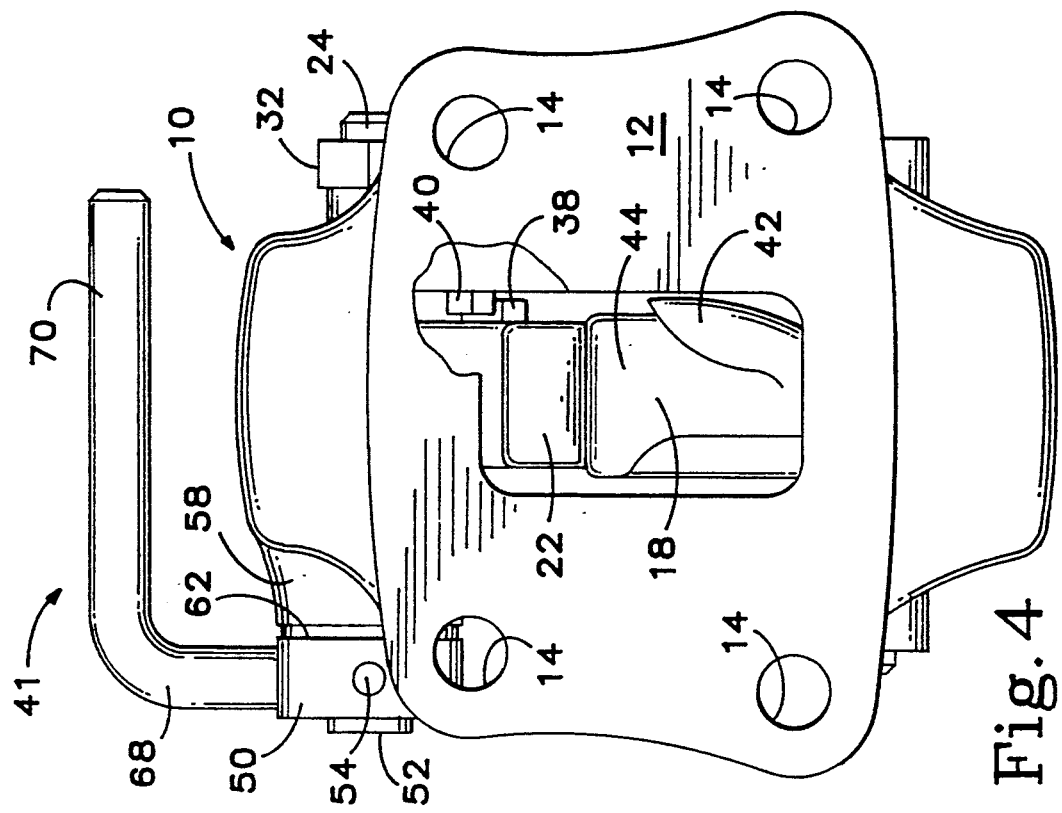
FIG. 5 is a sectional view taken along the lines 5—5 in FIG. 2.

Located on the right side of the latch, as viewed in FIGS. 4 and 5, is a protruding lip 38 which overlaps a protruding lug 40, located on the side wall of the body when the latch is seated in the notch and in its normal longitudinal orientation. In order to rotate the latch clockwise and lift it out of the notch 36, so that the coupling member can be moved to its open position, it is necessary to first move the latch to the left until the lip 38 clears the lug 40. This is accomplished by a handle mechanism 41 associated with the shaft 24, which will be explained in detail below.

Referring now also to FIG. 4, located on the inner edge of the latch 18 is an upwardly projecting pointed finger 42. The finger 42 fits beside the latch 22 when the latch is moved away from the right-hand side wall and the coupling member is moved to its open position. The spring 33 urges the latch against the finger which creates a frictional resistance between them which prevents rotation of the latch and holds the coupling member in its open position, unless the coupling member is forcibly moved to its closed position. In addition, the bottom surface 44 of the latch 22 and the forward end 46 of the coupling member 18 are arcuate and nestle against one another when the coupling member is open. Since the spring 34 urges the latch toward the coupling member, these mating surfaces also are frictionally engaged and hold the coupling member in its open position.

A tang 48 located at the top of the coupling member extends into the open space below the prong 16 when the coupling member is open. When a draw bar is inserted onto the device and strikes the tang 48, it pushes the coupling member back to its closed position. As the coupling member returns to its closed position the spring 34 causes the latch to be rotated clockwise into the notch 36, and the spring 33 causes the latch to move sideways against the right-hand sidewall where the lip 38 fits under the lug 40. The device then is again double locked in its closed position.

The handle assembly 41 that facilitates translation and rotation of the shaft 24 and latch 22 includes an annular ring 50 that fits over an extension 52 of the shaft 24 that extends outwardly from the left-hand side wall of the body, as viewed in FIG. 3. The ring is rotatably joined to the shaft extension by a pin 54 that is attached to opposed sides of the ring and fits rotatably through a hole 56 in the shaft extension. The inner diameter of the ring is sufficiently larger than the outer diameter of the shaft extension to permit rotation of the ring on the shaft extension. A boss 58, located in the body surrounding the shaft, provides a flat annular face 60 that is oriented normal to the longitudinal axis of the shaft. The ring has a flat surface 62 on the side that faces the body and it is attached to the shaft in a manner such that the face 60 and surface 62 contact opposite sides of a washer 64 which is located between them when the shaft is in its normal position. Thus, when the ring 50 is rotated about the pin 54, as shown in phantom line in FIG. 3, it acts like a cam and pushes against the face 60 of the boss 58 to move the shaft to the left against the compressive force of the spring 33. Thus, the lip 38 on the latch 22 is pulled free from the lug 40 so that the latch can be rotated. A handle 66 is attached to the ring to facilitate its rotation about the pin 54 and in the rotation of the shaft. The handle is L-shaped with a short portion 68 that is attached to the ring and has an axis that is normal to the center line of the pin, and a long portion 70 that is parallel with the shaft and extends over the hitch body.

In an alternate embodiment of the invention, shown in FIGS. 6 and 7, a ring 72 is not joined to the shaft 24, but is retained by a stop 74 that is attached to the end of the shaft. In the embodiment illustrated, the stop 74 includes a collar 76 that overlies that portion of the shaft that is circumscribed by the ring 72. This is not essential, however, and the stop 74 can simply be joined to the end of the shaft. In either event the stop preferably is permanently attached to the shaft, such as by welding. In this embodiment, the ring 72 has a first flat surface 77 on the side that abuts the face 60 of the boss 58 and a second flat side 78 on the side that abuts the stop. In addition, the stop is located on the shaft such that there is little or no clearance between the ring and the stop and the boss.

Smoother operation is provided with this embodiment of the invention if the portion of the shaft that extends through the ring has opposed flat sides 80. In addition, the portion of the ring 72 that abuts the shaft includes opposed flat sides 82 which mate with the sides 80.

To open the trailer coupling to insert or remove a draw bar, the long handle portion 70 is pulled outwardly from the body 10. This causes the ring 50 to rotate about the pin 54, push against the face 60 of the boss 58, pull the shaft 24 to the left against the spring 32, and pull the lip 38 on the latch 22 away from the lug 40. The handle is then pulled rearwardly to rotate the latch away from the notch 36 in the coupling member 18, and the coupling member can be manually rotated to its open position. When the coupling member is rotated to its open position, the finger 42 fits behind the latch and the bottom surface 44 of the latch contacts the forward end 46 of the coupling element, both of which hold the coupling element open as was explained above. When a draw bar is placed on the hitch it strikes the tang 48 at the top of the coupling member and pushes the coupling member back to its closed position.

The handle mechanism 41 of the subject invention facilitates opening the trailer coupling even when a load is pushing the coupling member against the latch to prevent its being pulled free of the lug 40. The cam action between the ring 50 and the boss 58, and the mechanical advantage created by the shape of the handle easily overcome any resistance to movement of the latch.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a double lock trailer coupling of the type having a coupling member that is movable in a body between an open and a closed position, a latch that is carried upon an elongate shaft wherein the latch and shaft are longitudinally movable and axially rotatable about a longitudinal axis, and a lug that prevents axial rotation of the shaft and latch unless the shaft and latch are first displaced longitudinally, the improvement comprising:
   a. cam means, rotatably attached to the shaft for rotation about an axis that is not parallel to the longitudinal axis of the shaft, for causing longitudinal movement of the latch and shaft; and
   b. lever means for causing rotation of said cam means thereby causing longitudinal movement of the shaft and latch to avoid the lug, said lever means also for causing axial rotation of the shaft and latch so that the coupling member may move between the closed position and the open position.

2. The trailer coupling of claim 1 wherein said cam means comprises an annular ring that circumscribes the shaft.

3. The trailer coupling of claim 2 wherein said ring has a first flat side and said cam means further comprises a boss located on said body having a flat face that abuts said first flat side.

4. The trailer coupling of claim 2 wherein the shaft has an opening defined therein and said ring is rotatably joined to the shaft through a pin that is attached to said ring on opposed sides thereof and passes through said opening.

5. The trailer coupling of claim 2 wherein said lever means comprises a handle that is attached to said ring.

6. The trailer coupling of claim 4 wherein said lever means comprises a handle that has a portion which defines an axis that is normal to an axial centerline of said pin.

7. The trailer coupling of claim 6 wherein said handle is L-shaped.

8. The trailer coupling of claim 3 wherein the shaft has an opening defined therein and said ring is rotatably joined to the shaft through a pin that is attached to said ring on opposed sides thereof and passes through said opening.

9. The trailer coupling of claim 8 wherein said lever means comprises a handle that is attached to said ring.

10. The trailer coupling of claim 9 wherein said handle has a portion that defines an axis that is normal to an axial centerline of said pin.

11. The trailer coupling of claim 10 wherein said handle is L-shaped.

12. The trailer coupling of claim 3 wherein said ring has a second flat side opposed to and parallel with said first flat side, and the shaft includes a stop located on a terminal end thereof that abuts said second flat side.

13. The trailer coupling of claim 12 wherein said annular ring has a central opening defined therein that circumscribes the shaft, and said central opening and the portion of the shaft circumscribed thereby both have a pair of opposed planar surfaces.

* * * * *